(12) United States Patent
Orriss et al.

(10) Patent No.: US 7,936,534 B2
(45) Date of Patent: May 3, 2011

(54) APPARATUS FOR SUPPORTING A DISK DRIVE ABOUT A ROTATION CENTRE WHICH IS OUTSIDE A DISK DRIVE RECEIVING PORTION FOR REDUCING VIBRATIONS AND A DISK DRIVE TEST APPARATUS USING SAME

(75) Inventors: David John Orriss, Southampton (GB); Alexander Stephen Kay, Portsmouth (GB); Matthew Roy Hill, Southampton (GB)

(73) Assignee: Xyratex Technology Limited, Havant (GB)

(*) Notice: Subject to any disclaimer, the term of this patent is extended or adjusted under 35 U.S.C. 154(b) by 933 days.

(21) Appl. No.: 11/883,630

(22) PCT Filed: Mar. 16, 2006

(86) PCT No.: PCT/GB2006/000970
§ 371 (c)(1),
(2), (4) Date: Aug. 3, 2007

(87) PCT Pub. No.: WO2006/100445
PCT Pub. Date: Sep. 28, 2006

(65) Prior Publication Data
US 2008/0007865 A1    Jan. 10, 2008

Related U.S. Application Data

(60) Provisional application No. 60/664,170, filed on Mar. 23, 2005.

(51) Int. Cl.
*G11B 5/012* (2006.01)

(52) U.S. Cl. .................. 360/97.02; 360/97.03
(58) Field of Classification Search .... 360/97.02–97.03; 361/600–837
See application file for complete search history.

(56) References Cited

U.S. PATENT DOCUMENTS 5,349,486 A * 9/1994 Sugimoto et al. .......... 360/97.01
(Continued)

FOREIGN PATENT DOCUMENTS

JP    2003016771    *    1/2003
(Continued)

OTHER PUBLICATIONS

International Search Report issued in PCT/GB2006/000970, dated May 11, 2006, 4 pages.
(Continued)

*Primary Examiner* — Allen J Heinz
(74) *Attorney, Agent, or Firm* — Pillsbury Winthrop Shaw Pittman LLP

(57) ABSTRACT

Apparatus for supporting a disk drive with a rotating disk about a disk axis and an arm which pivots over the disk about an arm axis. The disk axis and the arm axis are perpendicular to the plane of the disk. The apparatus includes a disk drive carrier having a disk drive receiving portion where disk drive can be received, and a housing in which the carrier can be received. A mounting arrangement is provided for supporting the carrier within the housing such that the center of rotation of the carrier is outside the disk drive receiving portion of the carrier. Additionally, a mounting arrangement is provided for supporting the carrier within the housing, comprising a forced pivot at or towards the opposite end of the disk drive carrier, and about which the carrier is fixed for pivotal movement in the housing.

15 Claims, 11 Drawing Sheets

U.S. PATENT DOCUMENTS 6,937,432 B2 * 8/2005 Sri-Jayantha et al. ..... 360/97.01
2003/0043550 A1 3/2003 Ives
2003/0206397 A1 11/2003 Allgeyer

FOREIGN PATENT DOCUMENTS

JP 2003016771 A 1/2003
WO 97/06532 A 2/1997

OTHER PUBLICATIONS

R. J. Lindner, "Disk Drive Mounting", IBM Technical Disclosure Bulletin, vol. 16, No. 3, Aug. 1973, pp. 903-904.

Examination Report issued in related British applicaitn GB0713467.9, May 9, 2008, 2 pages.

* cited by examiner

Δε=delta error between track Position and Head Arm

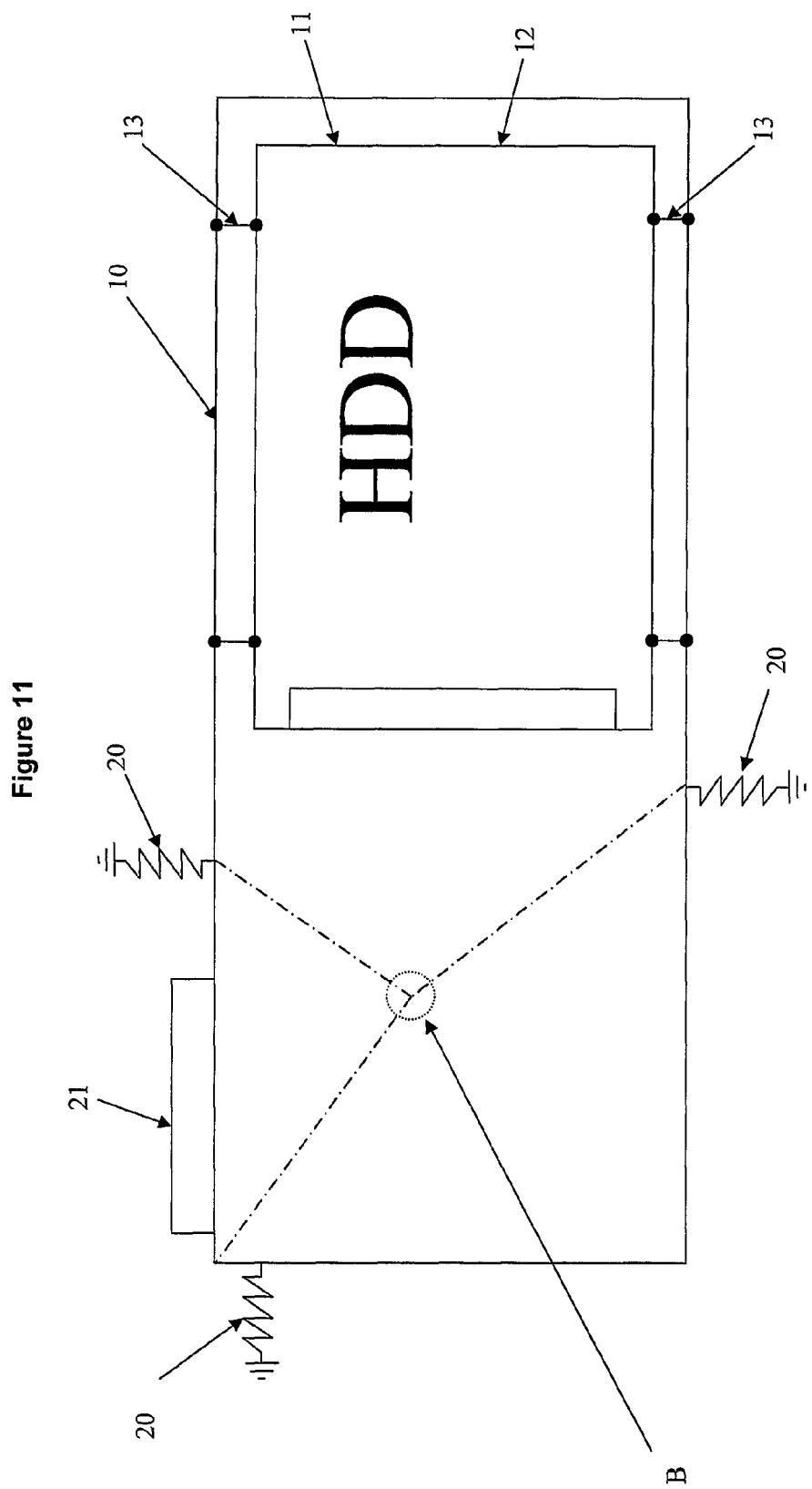

APPARATUS FOR SUPPORTING A DISK DRIVE ABOUT A ROTATION CENTRE WHICH IS OUTSIDE A DISK DRIVE RECEIVING PORTION FOR REDUCING VIBRATIONS AND A DISK DRIVE TEST APPARATUS USING SAME

CROSS REFERENCE TO RELATED APPLICATIONS

This is the U.S. National Phase of PCT/GB2006/000970, filed Mar. 16, 2006, which in turn claims priority to U.S. provisional application No. 60/664,170 filed Mar. 23, 2005, both of which are incorporated herein in their entirety by reference.

The present invention relates to apparatus for supporting a disk drive and to disk drive test apparatus for receiving plural disk drives.

The present invention has particular application when testing a disk drive during the manufacturing process. However, the present invention has application to mounting of a disk drive during a servo-writing process (when servo tracks are written to the disk drive, including the case where a separate clock head is used as well as the self-servo writing process and the self-servo fill process), and during normal end use of the disk drive by an end user.

Examples of arrangements for supporting a disk drive are disclosed in U.S. Pat. No. 6,018,437, WO-A-97/06532, WO-A-03/021597, WO-A-03/021598 and WO-A-2004/114286, the entire disclosures of which are hereby incorporated by reference. In many of these arrangements, the disk drive is supported in a carrier (or "tray") which is inserted into and removed from a housing (or "chassis"). Typically, this insertion and removal is automated and is carried out by a robotic arm.

As is well known, vibrations arising in the apparatus can affect the operation of the disk drive and it is therefore desirable to minimise the effect of such vibrations. This is particularly important during manufacture and testing of a disk drive as these processes are particularly susceptible to error. Vibrations mainly arise from rotation of the disk and/or the pivoting movement of the disk arm that carries the read/write head or heads. There is also often a fan present, which gives rise to its own vibrations. To minimise the effect of vibrations, typically the disk drive is effectively clamped to a large mass. As is well known, in general the greater the mass, the lower the frequency of the rotational mode of the combination of the disk drive and carrier. Whilst in principle it is possible to increase the mass, this becomes very problematic when plural disk drives are being operated on in the same housing. For example, existing servo writing and/or testing apparatus may operate on one thousand or more disk drives simultaneously. Simply increasing the mass to which each disk drive is clamped can result in the housing having a very large mass overall, and also inevitably increases the cost of the equipment because of both the capital cost of the masses themselves and also the cost of the additional supporting arrangements that are needed to support such a heavy total mass.

Referring now to FIG. 1, there is shown schematically a plan view of a disk drive 1. The disk drive 1 contains a rotatable disk 2, which in this case is a magnetic "hard" disk, which rotates about a disk axis 3. A pivoting arm 4, which typically carries the read/write head or heads at one end, pivots about a pivot axis 5. A power and data connector 6 is shown at one end of the disk drive 1. In use, when mounted in a carrier or the like (not shown), spring-loaded drive clamps 7 are used to clamp the disk drive 1 rigidly in the carrier or the like. Shown as point A is the centre of rotation of the disk drive 1 in the housing in which the carrier or the like is ultimately received during operation of the disk drive 1. As can be seen, this rotation centre A is within the footprint of the disk drive 1 and in this case is between and close to each of the disk axis 3 and the arm axis 5. For reasons of simplicity for present purposes, it is assumed that the centre of rotation A of the combination is at the intersection between the connection points of the clamps 7 to the disk drive 1, though in practice this may not necessarily be the case.

The effect of this is shown schematically in FIG. 2. As the disk drive 1 rotates in say an anti-clockwise direction about the centre of rotation A, the disk 2 tends to rotate in the opposite, clockwise direction about the disk axis 3. Similarly, the arm 4 tends to rotate in a clockwise direction about the arm axis 5. The effect of this is shown schematically in FIG. 3 in which P is the initial position of the head of the arm 4 over a particular track on the disk 2 to which data is to be written or from which data is to be read. As can be seen, the particular track on the disk 2 has moved to a position $P_1$ and the arm on the head 4 has moved to a position $P_2$. Owing to the relative positioning of the centre of rotation A, the disk axis 3 and the arm axis 5, this leads to a large error $\Delta\epsilon$ between the track position $P_1$ and the position $P_2$ of the head on the arm 4.

As has been mentioned, the conventional way of minimising the effect of these rotational vibrations is to use a large mass to which the disk drive 1 is clamped. However, as already mentioned, it is preferred to avoid having very large masses.

According to a first aspect of the present invention, there is provided apparatus for supporting a disk drive that has a disk which rotates in use about a disk axis and an arm which pivots over the disk in use about an arm axis, the disk axis and the arm axis being generally perpendicular to the plane of the disk, the apparatus comprising: a disk drive carrier having a disk drive receiving portion in which a disk drive can be received; a housing in which the carrier can be received; and, a mounting arrangement for supporting the carrier within the housing such that the centre of rotation of the carrier is outside the disk drive receiving portion of the carrier.

By so arranging the apparatus, the angle through which the disk drive can pivot as a result of vibration is less than in the prior art discussed above (under equivalent conditions), which in itself helps to reduce the position error. Moreover, the distance from the arm axis to the centre of rotation of the carrier, and the distance from the disk axis to the centre of rotation of the carrier, can be greater than in the prior art discussed above, which again helps to reduce the position error. (The relatively increased distance between the arm axis and the centre of rotation of the carrier is probably the greatest contributor to the reduction in timing error during reading from and writing to the disk.) The radial component of vibration acting on the carrier can be much less than the tangential component of vibration acting on the carrier ("radial" and "tangential" being measured with reference to the centre of rotation of the carrier).

The disk drive receiving portion of the carrier is preferably towards one end of the carrier and the mounting arrangement is such that the centre of rotation of the carrier is at or towards the opposite end of the carrier. This serves to reduce to a minimum the effect of vibrations on the disk drive.

The mounting arrangement preferably comprises a forced pivot at or towards said opposite end of the disk drive carrier and about which the carrier is fixed for pivotal movement in the housing. The forced pivot provides a secure and well-defined position for the centre of rotation of the carrier. Moreover, a forced pivot provides a reaction point against which the carrier effectively abuts when a disk drive is being inserted into the carrier. This is especially useful when the insertion of the disk drive is automated and carried out by a robot or the like. Examples of a suitable forced pivot include a pivot pin, a plate, a so-called living hinge, or any similar arrangement that mechanically defines the pivot point of the carrier. This is in contrast to for example a pivot that is defined as a resultant of the various moving masses, spring forces of isolators, etc., which is typical of the prior art.

At least one isolator may be provided for isolating the carrier from the housing, the at least one isolator being connected to the carrier at a position that is outside the disk drive receiving portion of the carrier. This forces a rotational mode of vibration that is of low frequency as desired and well away from the disk. Plural isolators may be provided for isolating the carrier from the housing, each of the isolators being respectively connected to the carrier at a position that is outside the disk drive receiving portion of the carrier.

The mounting arrangement may comprise plural isolators for mounting the carrier in the housing and isolating the carrier from the housing, the isolators being arranged such that the centre of rotation of the combination of the carrier and the disk drive when received in the housing is outside the disk drive receiving portion of the carrier. In this embodiment, the plural isolators may provide the only support for the carrier in the housing. Each of the isolators may be respectively connected to the carrier at a position that is outside the disk drive receiving portion of the carrier. In one preferred embodiment, there are exactly three of said isolators.

According to a second aspect of the present invention, there is provided disk drive test apparatus for receiving plural disk drives for testing of the disk drives, each disk drive having a disk which rotates in use about a disk axis and an arm which pivots over the disk in use about an arm axis, the disk axis and the arm axis being generally perpendicular to the plane of the disk, the apparatus comprising: a plurality of disk drive carriers arranged generally in a vertical column, each disk drive carrier having a disk drive receiving portion in which a disk drive can be received; a housing having plural bays, each bay being capable of receiving a respective one of the disk drive carriers therein; and, a mounting arrangement for each disk drive carrier for supporting the respective carriers within the housing; each mounting arrangement being arranged such that the centre of rotation of the respective carrier is outside the disk drive receiving portion of the carrier, the centres of rotation of the carriers being arranged in a vertical column.

Amongst other features, this aspect helps control of and minimises cross-talk between drives received in the respective carriers, as well as reducing the effect of vibration as in the other aspects described herein.

The disk drive receiving portion of each of said carriers is preferably towards one end of the respective carrier and the mounting arrangement for the respective carriers is preferably such that the centre of rotation of the respective carrier is at or towards the opposite end of the carrier.

The mounting arrangement for each disk drive carrier preferably comprises a forced pivot at or towards said opposite end of the disk drive carrier and about which the carrier is fixed for pivotal movement in the housing.

According to a third aspect of the present invention, there is provided apparatus for supporting a disk drive that has a disk which rotates in use about a disk axis and an arm which pivots over the disk in use about an arm axis, the disk axis and the arm axis being generally perpendicular to the plane of the disk, the apparatus comprising: a disk drive carrier having a disk drive receiving portion at or towards one end in which a disk drive can be received; a housing in which the carrier can be received; and, a mounting arrangement for supporting the carrier within the housing, the mounting arrangement comprising a forced pivot at or towards the opposite end of the disk drive carrier and about which the carrier is fixed for pivotal movement in the housing.

There may be at least one isolator for isolating the carrier from the housing, the at least one isolator being connected to the carrier at a position that is outside the disk drive receiving portion of the carrier. The apparatus may comprise plural isolators for isolating the carrier from the housing, each of the isolators being respectively connected to the carrier at a position that is outside the disk drive receiving portion of the carrier.

Embodiments of the present invention will now be described by way of example with reference to the accompanying drawings, in which.

Figure 4:
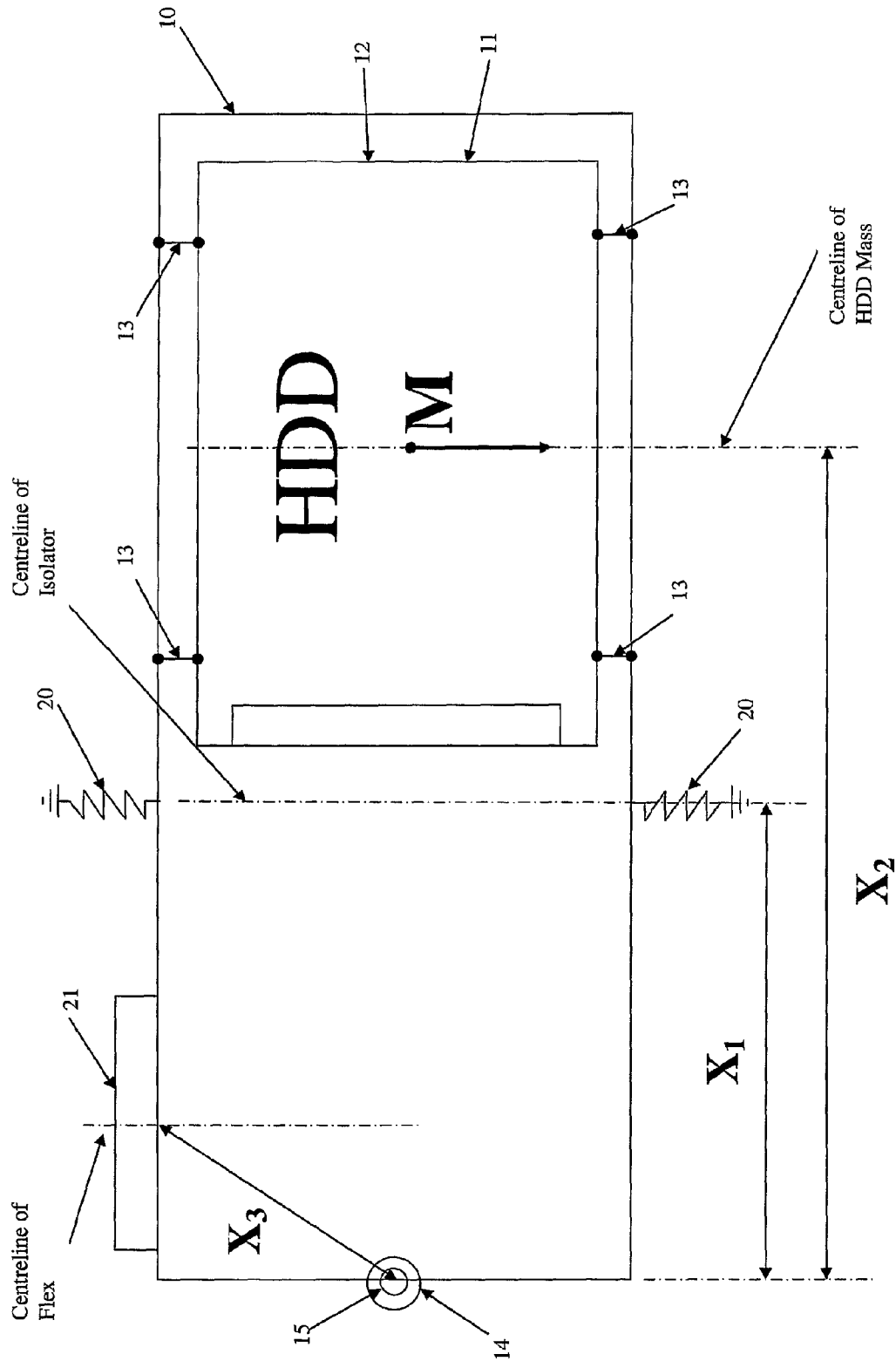
FIG. 4 shows schematically a plan view of an example of a disk drive mounted in a carrier according to an embodiment of the present invention.

Referring now to FIG. 4, in this example there is provided a relatively long disk drive carrier 10 in which a disk drive 11 can be received in a disk drive-receiving portion 12 which is provided towards one end of the carrier 10. Clamp arms 13 are provided, four being shown in this example, to clamp the disk drive 11 rigidly to the carrier 10.

Figure 5:
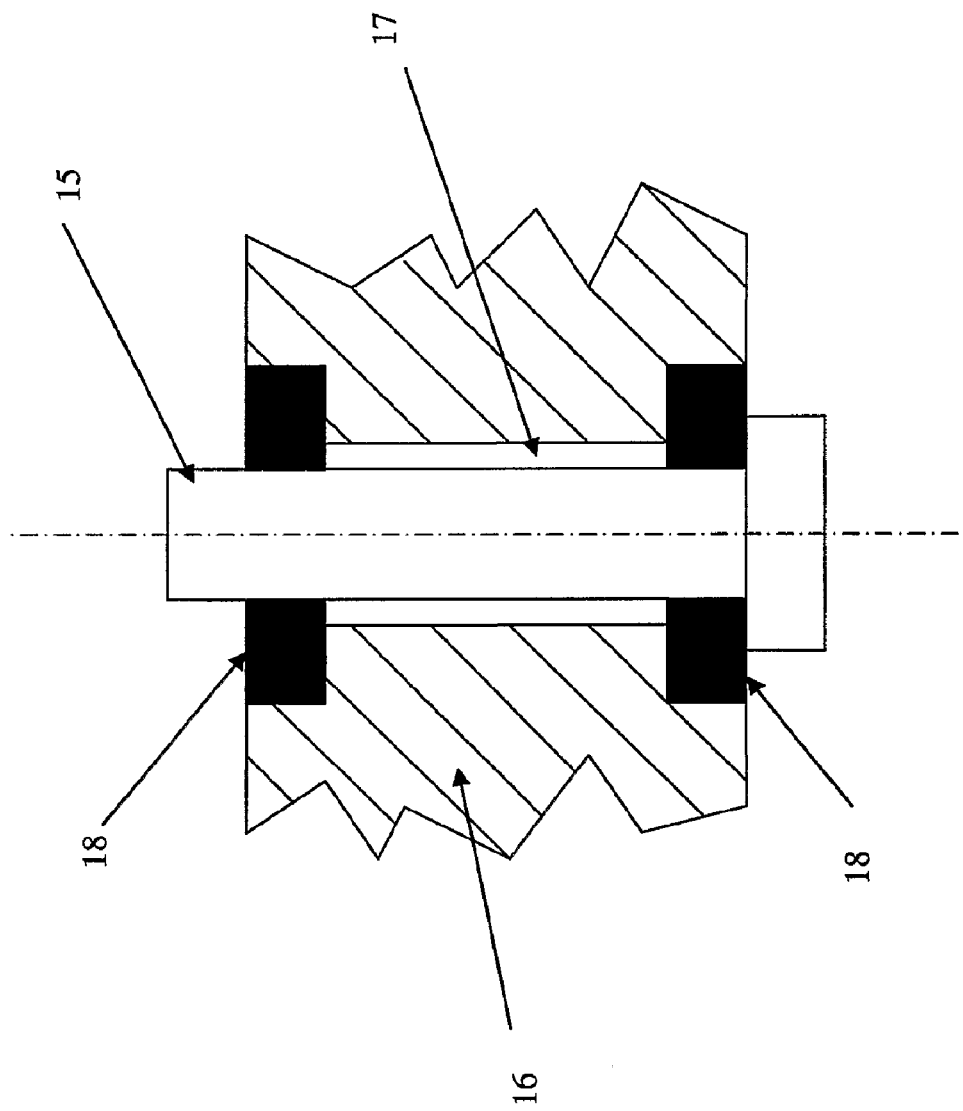
FIG. 5 shows a partial cross-sectional view through a pivot pin of the carrier of FIG. 4.

A through hole 14 is provided at the end of the carrier 10 that is opposite the disk drive receiving portion 12, the through hole 14 passing from top to bottom of the carrier 10. Referring briefly to FIG. 5, a pivot pin 15 passes through the through hole 14. In practice, the carrier 10 is most likely to be received in a bay in a housing or chassis 16, which may include plural such bays. In that case, the pivot pin 15 is fixed in a through hole 17 in the housing 16. Bushes or bearings 18 are preferably provided between the pivot pin 15 and the housing 16. These may be solid bearings 18 or may be for example a compliant but hard elastomer, such as natural rubber, which serves to prevent chatter.

Instead of a pivot pin 15, other forced pivots may be used, such as a plate, a so-called living hinge, or any similar arrangement that mechanically defines the pivot point of the carrier.

Figure 1:
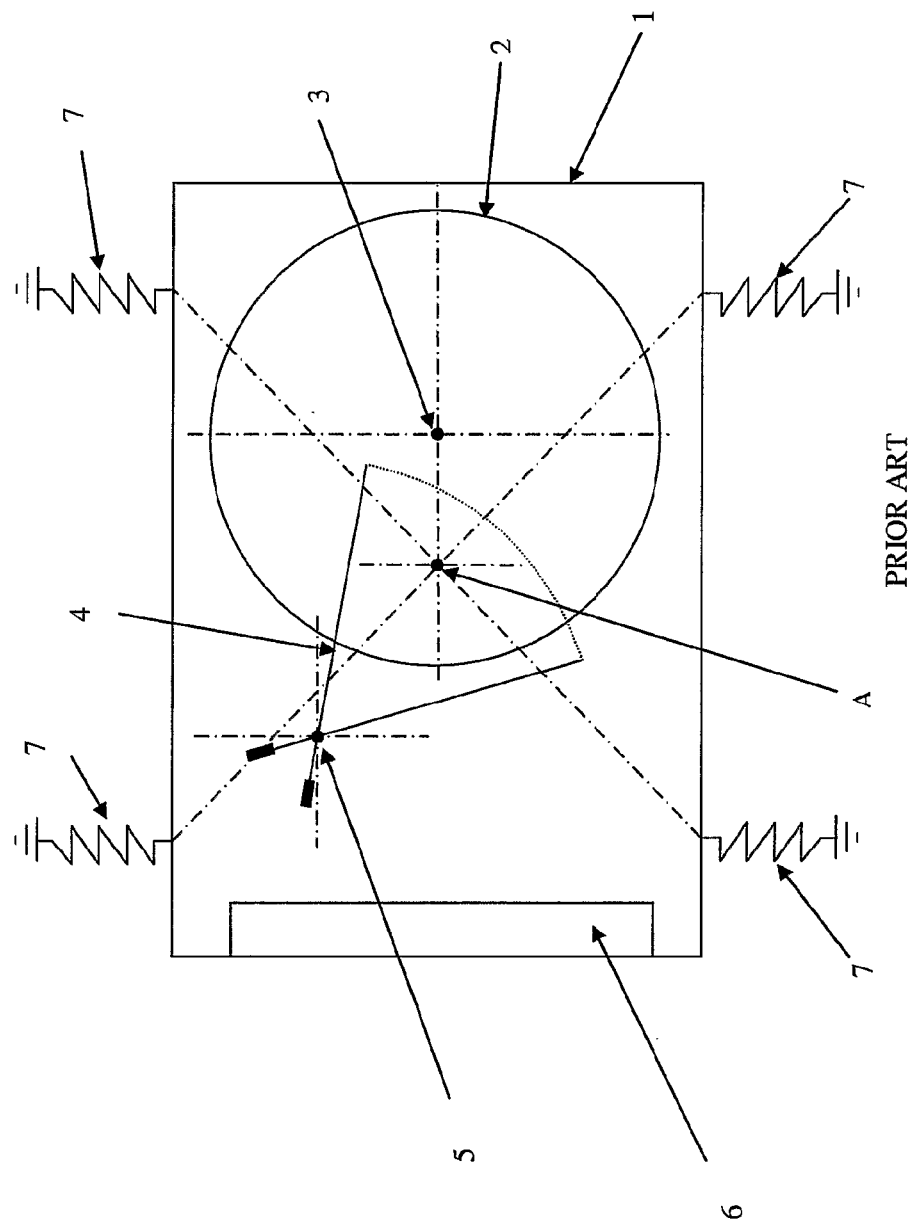
FIGS. 1 to 3 show schematically plan views of a disk drive mounting arrangement of the prior art and the effects of rotary vibration thereon.
Figure 2:
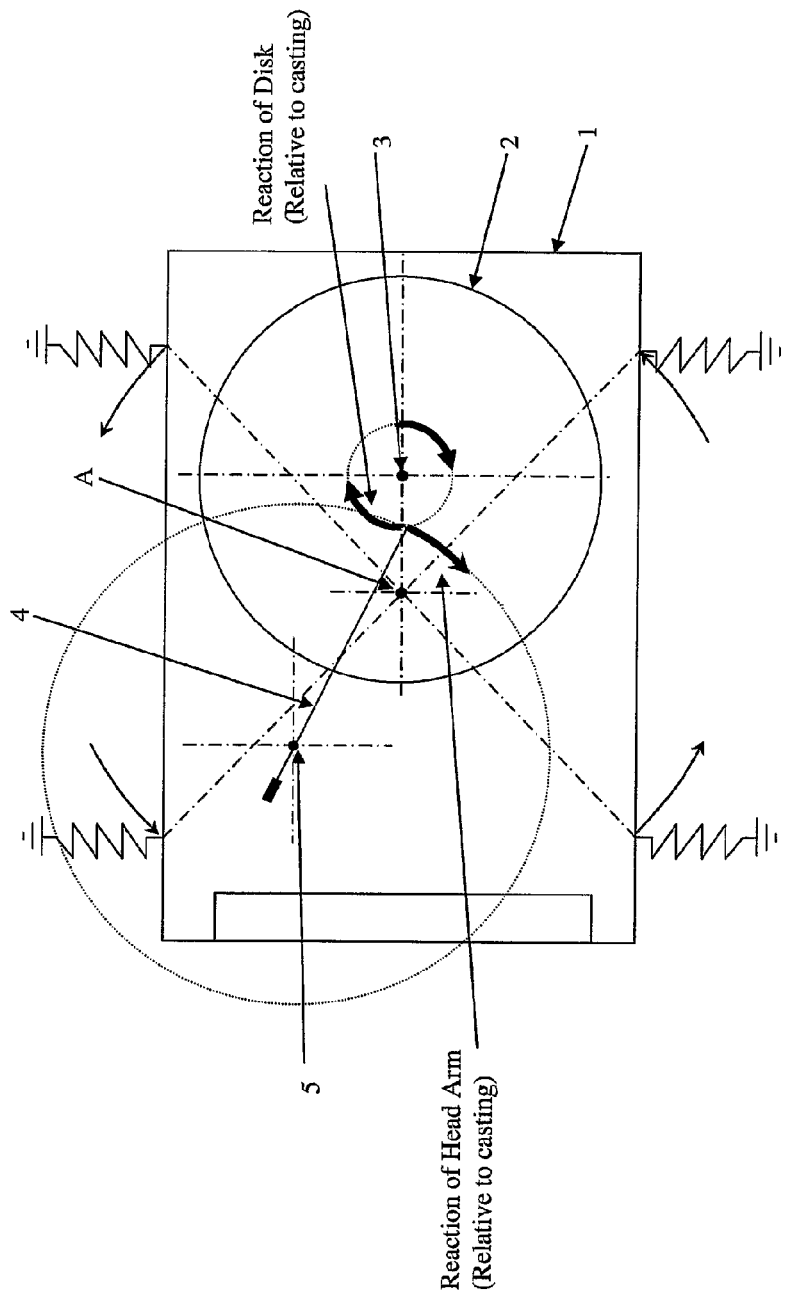
Figure 3:
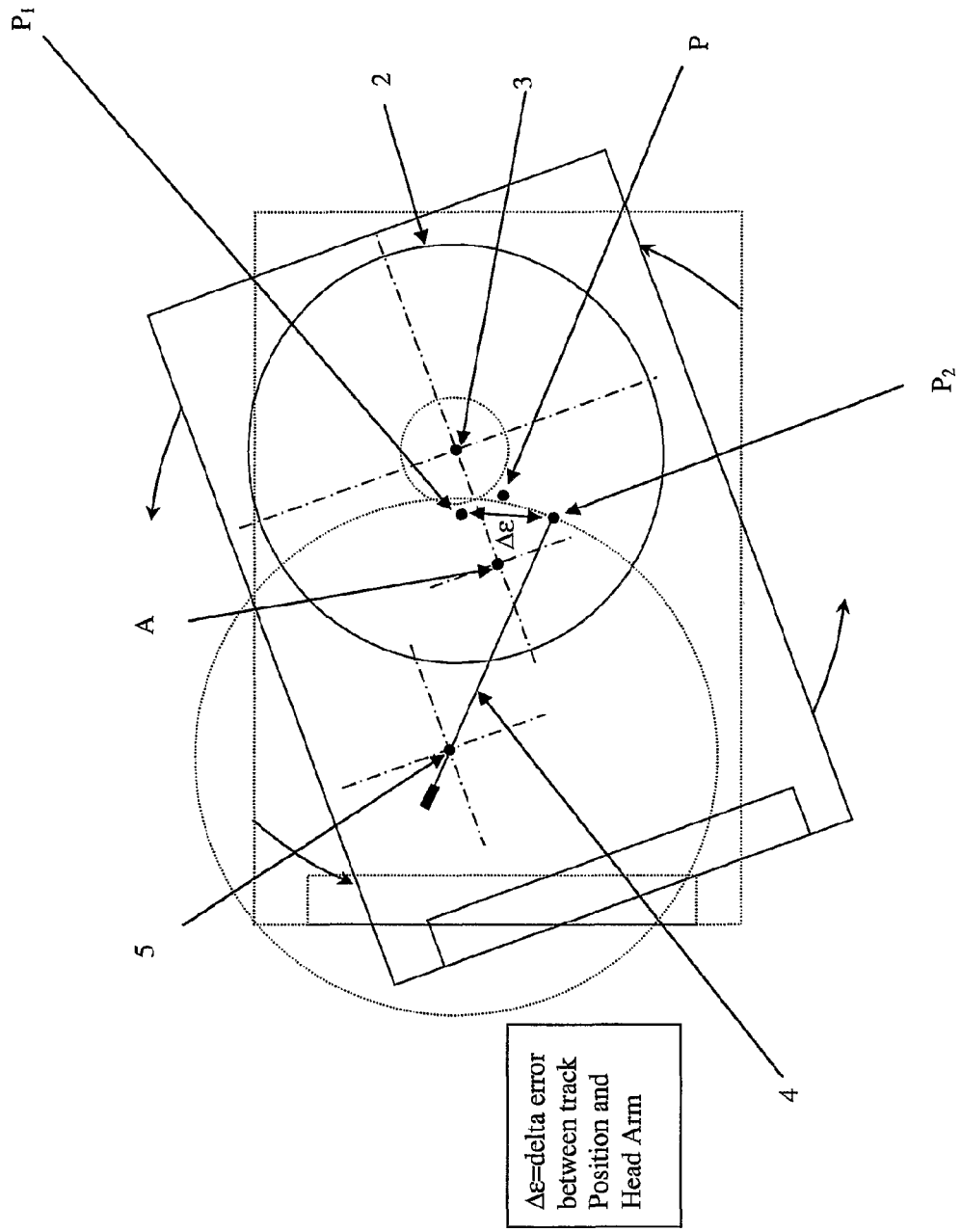
Figure 6:
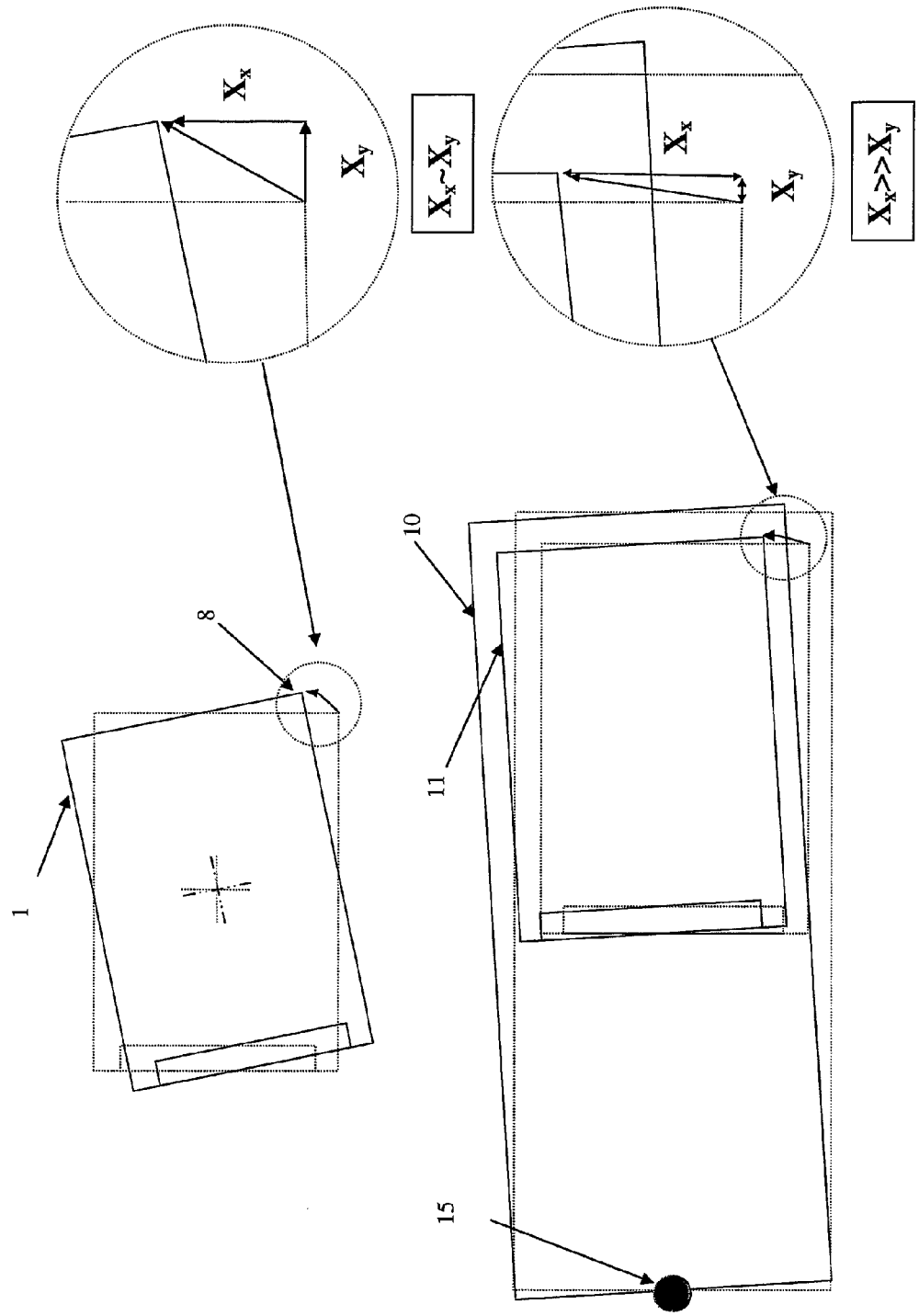
FIG. 6 and FIG. 7 show schematically the operation of the apparatus of FIG. 4 in reducing the effect of vibration compared to that of the prior art of FIG. 1.

Referring now to FIG. 6, the lower portion of the figure shows how the pivot pin 15 provides the centre of rotation of the carrier 10 in the housing 16 (not shown in FIG. 6). In the upper part of FIG. 6 there is shown the effect of a rotation on the prior art arrangement of FIG. 1. It will be understood that the amount of movement shown is greatly exaggerated for illustrative purposes only. There may be for example 60,000 or 100,000 or more tracks per inch on the surface of the disk, such that a very small positional error in the position of the arm 4 relative to the disk 2 can give rise to very significant errors during the read/write process. For ease of explanation, reference will be made to movement of a corner 8 of the disk drive 1, it being understood that a similar argument applies for all points in the disk drive 1. It will be further understood that it most important to minimise the movement of the arm 4 and secondarily to minimise movement of the disk 2.

Thus, still referring to the upper portion of FIG. 6, as the disk drive 1 and therefore the corner 8 rotates about the centre of rotation A, the movement of the corner 8 can be resolved into orthogonal components $X_x$ and $X_y$. In this example, because the centre of rotation A of the disk drive 1 is within the footprint of the disk drive 1 and, more particularly, in this example is generally positioned centrally of the disk drive 1, the orthogonal components $X_x$ and $X_y$ of the movement of the disk drive 1 are generally similar to each other, thus giving rise to a very large position error as discussed in the introduction above.

In contrast, and referring now to the lower part of FIG. 6, because the pivot pin 15 defines the carrier 10 and in this case is outside the footprint of the disk drive 11, and more particularly is far removed from the disk drive 11, the nature of the rotational movement of the carrier 10 with disk drive 11 is very different. In particular, the distribution of the displacements between the orthogonal directions $X_x$ and $X_y$ is such as to minimise the effect of the rotational movement. More specifically, the $X_x$ component, which is broadly tangentially disposed with respect to the pin 15, is relatively large, whereas the $X_y$ component, which is broadly radially disposed with respect to the pin 15, is very small. For example, the ratio between these displacements may be at least 5:1, or preferably 10:1, and most preferably 20:1 or more. Overall, therefore, the amount of movement of the disk drive 11, and therefore the disk and arm of the disk drive 11, is much reduced compared to the prior art. Moreover, transforming the effects of vibration in this manner such that the ratio of $X_x$ to $X_y$ is large tends to increase the linearity of the response to vibrations, which is therefore more easily accommodated by for example mechanical or electronic devices.

Referring again to FIG. 4, another advantage of the preferred arrangement is that the mass of the disk drive 11 is a relatively long way away from the centre of rotation of the carrier 10, which is of course defined by the pivot pin 15. As is well understood by those skilled in the art, providing a large mass at a distance from the centre of rotation of the disk drive and carrier serves to reduce the frequency of the rotational mode of vibration, and the greater the distance and/or the mass then the lower the frequency, which is generally considered to be an advantage. In the preferred embodiment, the mass of the disk drive 11 is itself used to maximum advantage for this purpose as it is practically as far as possible from the centre of rotation of the carrier 10, and therefore reduces the amount of other mass that additionally is provided to assist in damping vibrations. The centre of mass M of the disk drive 11 is shown at a distance $X_2$ from the pivot pin 15.

One or more isolators 20 are preferably provided between the carrier 10 and the housing 16. In the example shown, these isolators are connected to the carrier 10 at a position that is outside the footprint of the disk drive 11. The perpendicular distance $X_1$ between the pivot pin 15 and the or each isolator 20 is shown. As is known per se, as $X_1$ is reduced, the frequency of the lowest mode of rotation is reduced, which again is advantageous. Moreover, because the pin 15 is used to constrain the centre of rotation of the carrier 10, this means that the designer has more freedom of choice as to where to position the isolators 20. This in turn allows the frequency of the first mode of rotation to be tuned more easily, allowing significant freedom of choice for the designer. The materials used for the isolators can similarly also be varied more easily. This allows the designer to tune the frequency easily to be within the range 20 Hz to 80 Hz for example.

In practice, it is necessary to connect the disk drive 11 via the carrier 10 to a power and data source. Conventionally, this is achieved using a flexible circuit board or "flex". In the preferred embodiment shown in FIG. 4, a flex 21 is shown electrically connected to the carrier 10 at a position that is near the pivot pin 15, more precisely a distance $X_3$ from the pivot pin 15. Because the flex 21 is connected at a position that is near the pivot pin 15, the amount of movement experienced by the flex 21 during vibrational movement of the carrier 10 is as small as possible. This in turn means that any stiffness in the flex 21 has less of an effect on raising the frequency of the first mode of rotation of the carrier 10.

Figure 7:
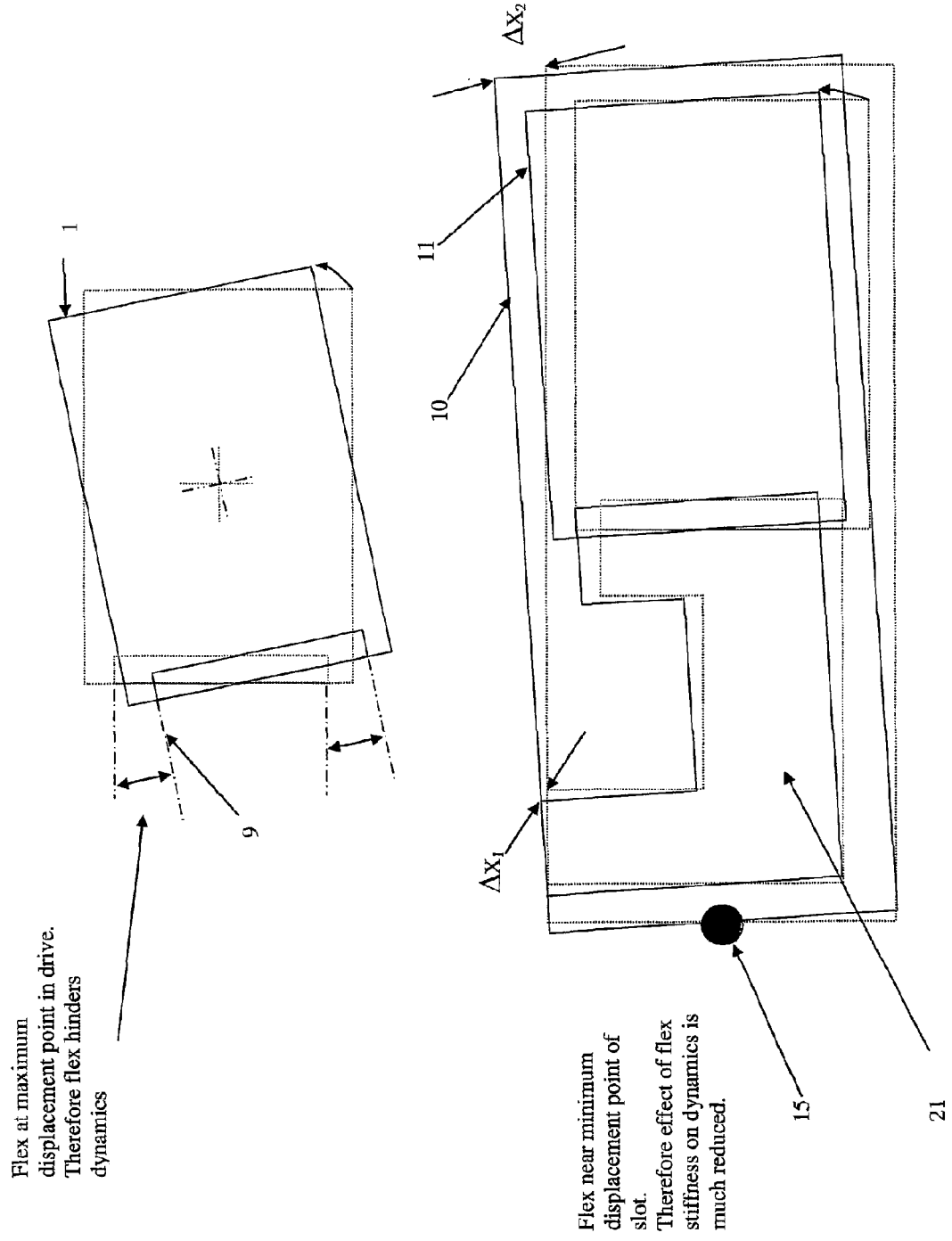

In contrast, in the prior art, the flex inevitably moved through a relatively large displacement when the carrier moved and thus the stiffness of the flex was significant and had to be allowed for during design of the apparatus of the prior art. This is shown schematically in FIG. 7 in which the upper portion shows the relatively large displacement of a flex 9 connected to a disk drive 1 of the prior art. In contrast, the lower part of FIG. 7 shows the relatively small displacement $\Delta X_1$ of the flex 21 connected to the carrier 10 at a position near the pivot pin 15. (In the lower part of FIG. 7, the flex 21 is shown wrapping over the top of the carrier 10.)

Figure 8:
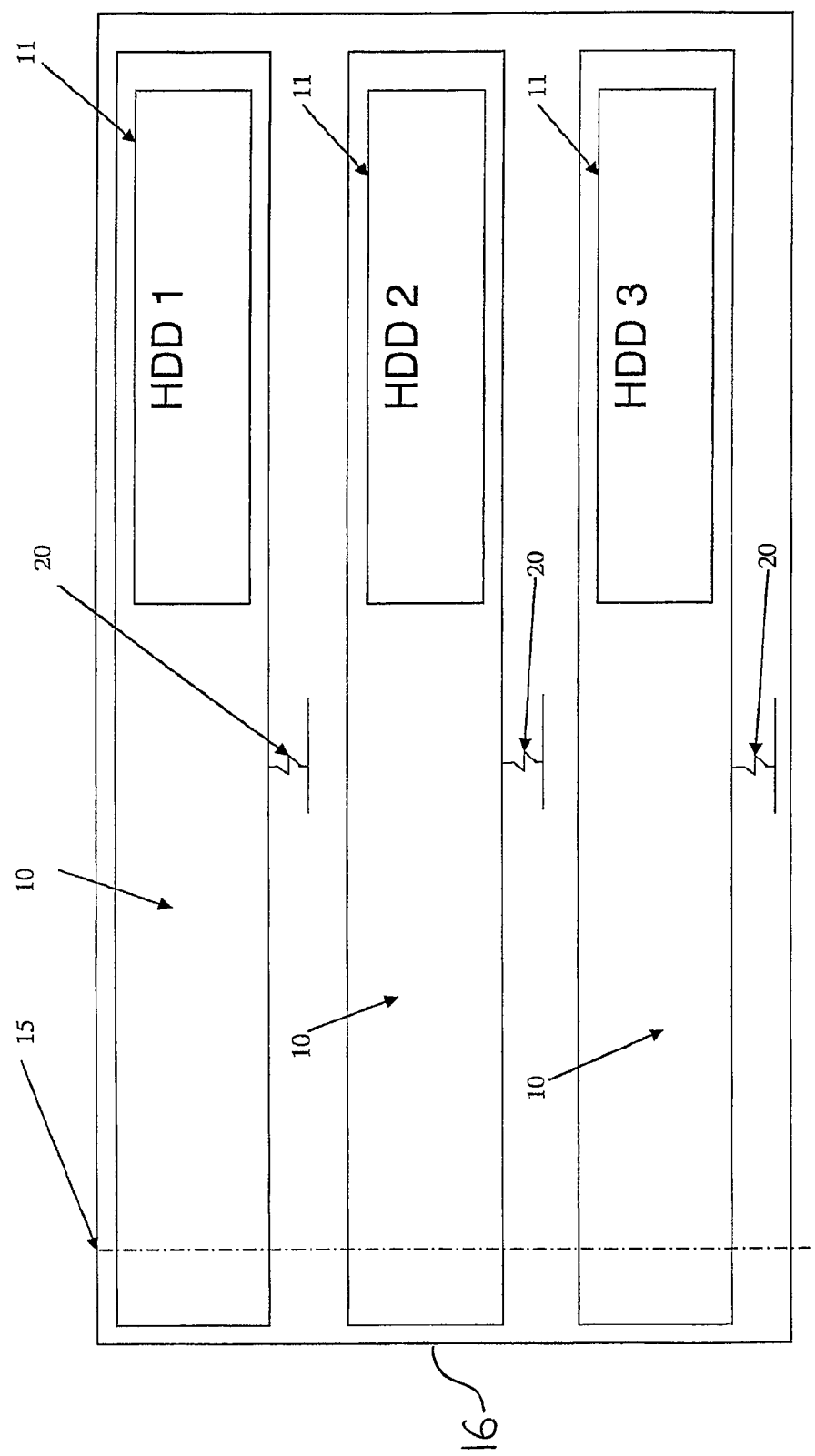
FIG. 8 shows schematically a side elevation of an example of a housing having plural carriers according to an embodiment of the present invention.

FIG. 8 shows schematically a side elevation of an example of a housing 16 having plural carriers 10 stacked vertically above each other in the housing 16. The centres of rotation of the carriers 10 are all collinear. This can be achieved by for example ensuring that the forced pivots, such as the pivot pins 15, are collinear. In one example, a common pivot pin 15 may pass through all of the vertically stacked carriers 10. In any event, the effect of this is that cross-talk between the disk drives 11 in the carriers 10 is minimised and indeed practically eliminated. In particular, as one disk drive 11 is operated, no torque is transmitted from that disk drive 11 to any of the other disk drives 11 because there is no lever arm through which the torque can operate (other than possibly through friction arising in the forced pivots, which is likely to be very small). In other words, because all of the carriers 10 pivot about a common centre, no moment is created between the carriers 10. (For completeness, it is mentioned that torque could be transmitted between the forced pivots 15 and the isolators 20, but this can be minimised by using substantial isolators 20 and ensuring that they are grounded to a point in the housing that has very low vibration.)

Figure 9:
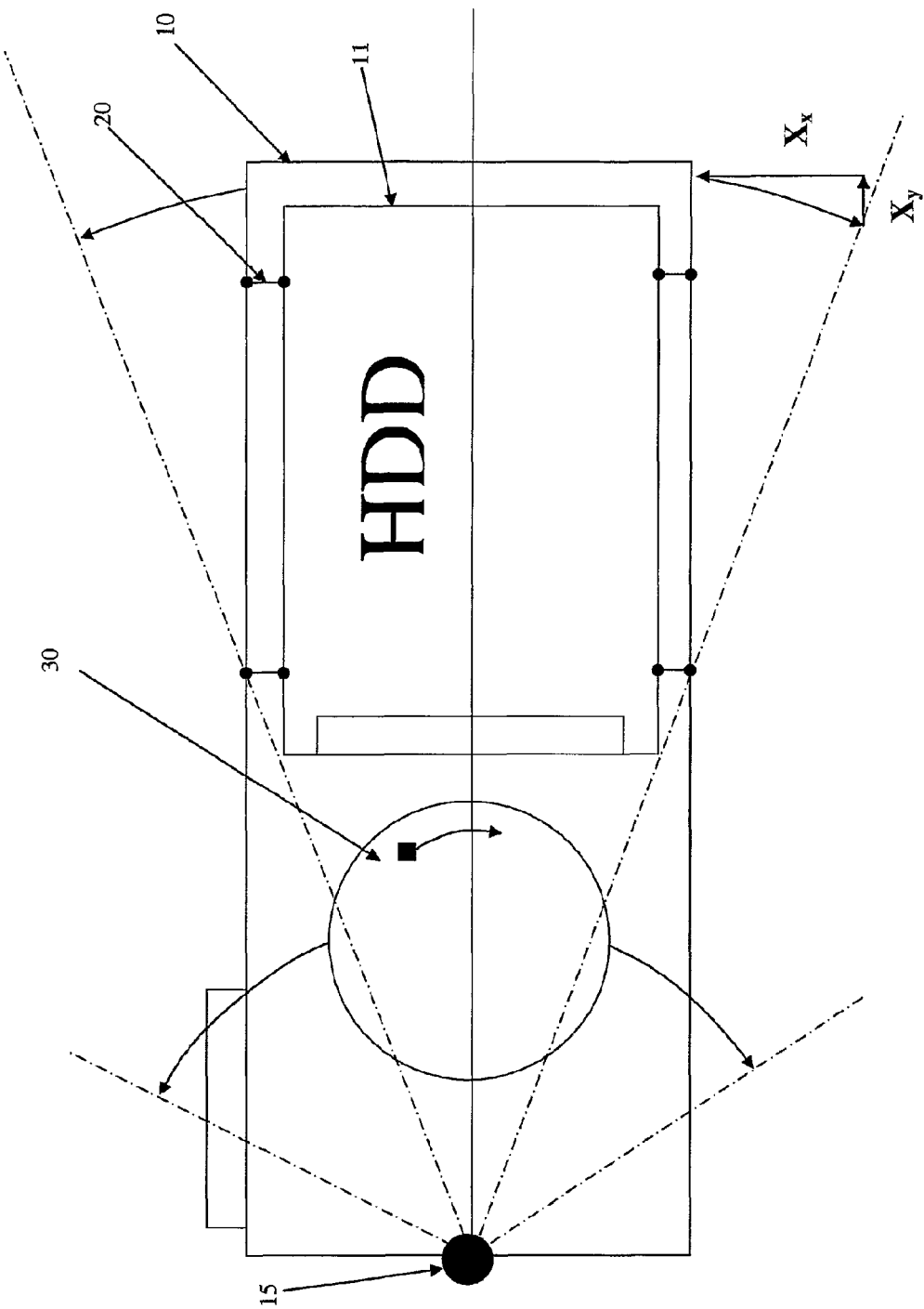
FIG. 9 shows schematically the effect of a rotating fan in an example of a carrier according to an embodiment of the present invention.

In FIG. 9 there is shown schematically a fan 30 which rotates about an axis that is perpendicular to the plane of the disk in the disk drive 11. Such fans 30 are used to blow air over the disk drive 11, either to cool the disk drive 11 with cold air or to warm the disk drive 11 with hot air (which is typically necessary when testing the disk drive 11 during manufacture). In the preferred embodiment, the fan 30 is positioned between the disk drive 11 and the forced pivot 15. In this way, if the fan 30 is not balanced, as will often be the case, then the effect of rotational vibrations arising in the carrier 10 because of the fan 30 will be minimised. As was described with reference to FIG. 6, this can be understood by resolving the movement of the carrier 10 arising from operation of the fan 30 into generally tangential and radial components $X_x$, $X_y$ and noting that the radial component $X_y$ is relatively small.

Figure 10:
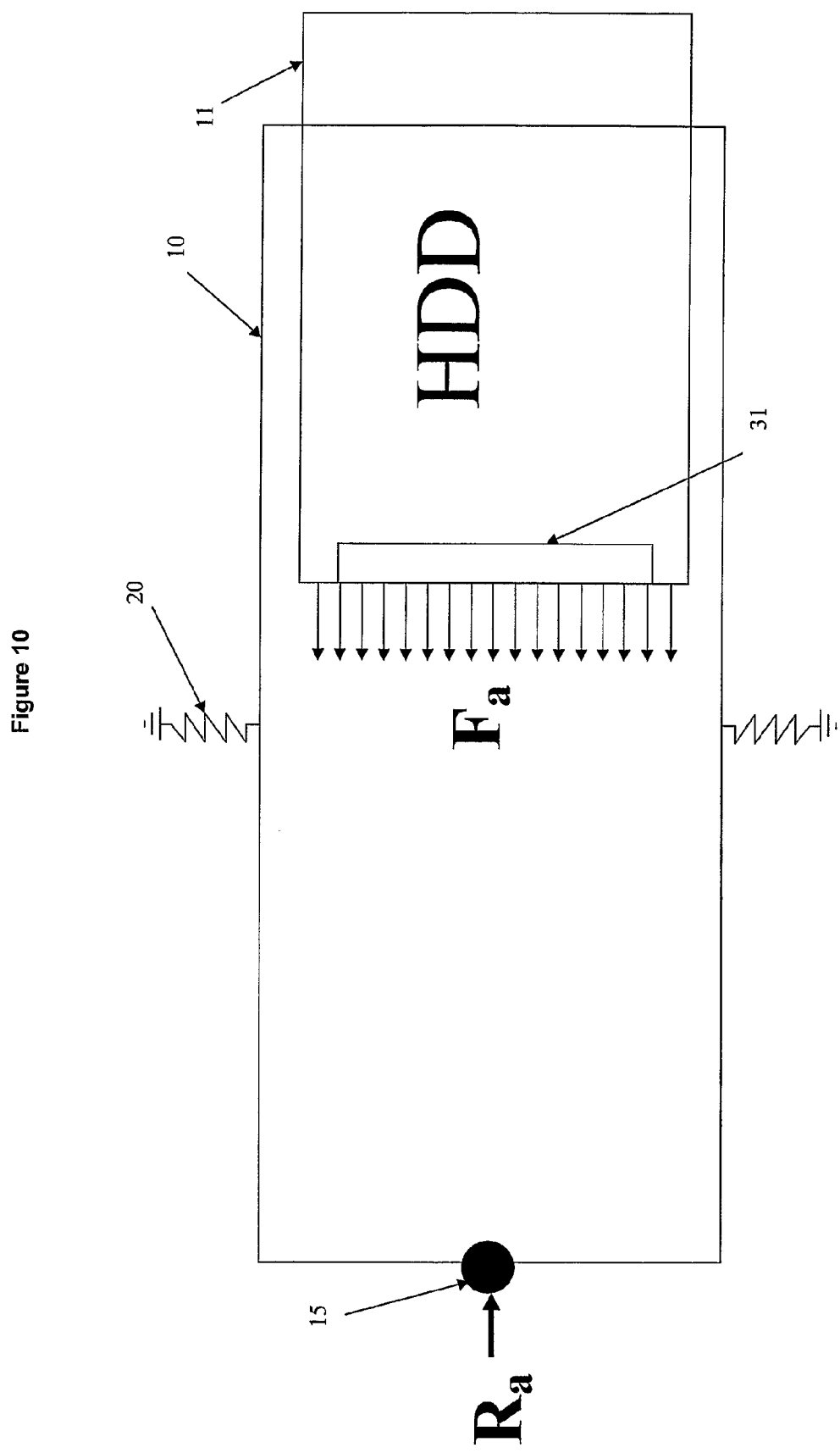
FIG. 10 shows schematically the use of a forced pivot to provide a reaction point during insertion of a hard disk drive into the carrier of FIG. 4; and, FIG. 11 shows schematically a plan view of another example of a disk drive mounted in a carrier according to an embodiment of the present invention.

Referring now to FIG. 10, in for example a testing process, in practice the disk drive 11 is inserted into the carrier 10, the disk drive 11 is tested, and then the disk drive 11 is removed. The relatively soft mount for the carrier in the housing of the prior art means that the carrier of the prior art "floats" somewhat in the housing, which can make it difficult to insert the disk drive 1 properly, and it is particularly difficult to ensure that the power and electrical connections between the disk drive 1 and the housing or the like are properly made. This is especially the case in an automated process in which a robot inserts the disk drive 1 and has required special arrangements to be made, including the need for the robot to grasp the carrier. To a large degree this can be avoided in the present embodiments that use a forced pivot 15 because the forced pivot 15 provides a datum point that is both well defined and rigid. Thus, as shown in FIG. 10, as the disk drive 11 is inserted into the carrier 10 and a force Fa is applied to the electrical connector 31 at the leading end of the disk drive 11, an equal reaction force Ra is applied by the forced pivot 15, facilitating the connection of the connector 31 of the disk drive 11 to the connector (not shown) of the carrier 10 or housing 16.

Whilst the preferred embodiments use a forced pivot, FIG. 11 shows an alternative in which a soft mounting arrangement is used. In this example, three isolators 20 are constructed and arranged so that the resultant pivot point B is outside the disk drive receiving portion 12 of the carrier 10. It will be understood that to achieve this, it may be necessary to take into account the mechanical properties of the whole of the system constituted by the carrier 10, the disk drive 11 (including the rotating disk and pivoting arm), the isolators 20, the clamps 13 and any fan or the like. In one preferred embodiment, each isolator 20 is positioned outside the footprint of the disk drive 11.

Embodiments of the present invention have been described with particular reference to the examples illustrated. However, it will be appreciated that variations and modifications may be made to the examples described within the scope of the present invention.

The invention claimed is:

1. Apparatus for supporting a disk drive that has a disk which rotates in use about a disk axis and an arm which pivots over the disk in use about an arm axis, the disk axis and the arm axis being generally perpendicular to the plane of the disk, the apparatus comprising:
    a disk drive carrier having a disk drive receiving portion in which a disk drive can be received;
    a housing in which the carrier can be received; and,
    a mounting arrangement for supporting the carrier within the housing such that the carrier rotates about a centre of rotation that is outside the disk drive receiving portion of the carrier and also substantially parallel to the arm axis.

2. Apparatus according to claim 1, wherein the disk drive receiving portion of the carrier is towards one end of the carrier and the mounting arrangement is such that the centre of rotation of the carrier is adjacent the opposite end of the carrier.

3. Apparatus according to claim 2, wherein the mounting arrangement comprises a forced pivot adjacent said opposite end of the disk drive carrier and about which the carrier is fixed for pivotal movement in the housing.

4. Apparatus according to claim 3, comprising at least one isolator for isolating the carrier from the housing, the at least one isolator being connected to the carrier at a position that is outside the disk drive receiving portion of the carrier.

5. Apparatus according to claim 4, comprising plural isolators for isolating the carrier from the housing, each of the isolators being respectively connected to the carrier at a position that is outside the disk drive receiving portion of the carrier.

6. Apparatus according to claim 1, wherein the mounting arrangement comprises plural isolators for mounting the carrier in the housing and isolating the carrier from the housing, the isolators being arranged such that the centre of rotation of the combination of the carrier and the disk drive when received in the housing is outside the disk drive receiving portion of the carrier.

7. Apparatus according to claim 6, wherein each of the isolators is respectively connected to the carrier at a position that is outside the disk drive receiving portion of the carrier.

8. Apparatus according to claim 7, wherein there are exactly three of said isolators.

9. Apparatus according to claim 6, wherein there are exactly three of said isolators.

10. Disk drive test apparatus for receiving plural disk drives for testing of the disk drives, each disk drive having a disk which rotates in use about a disk axis and an arm which pivots over the disk in use about an arm axis, the disk axis and the arm axis being generally perpendicular to the plane of the disk, the apparatus comprising:
    a plurality of disk drive carriers arranged generally in a vertical column, each disk drive carrier having a disk drive receiving portion in which a disk drive can be received;
    a housing having plural bays, each bay being capable of receiving a respective one of the disk drive carriers therein; and,
    a mounting arrangement for each disk drive carrier for supporting the respective carriers within the housing;
    each mounting arrangement being arranged such that each respective carrier rotates about a centre of rotation that is outside the disk drive receiving portion of the carrier, the centres of rotation of the carriers being arranged in a vertical column substantially parallel to the arm axes.

11. Apparatus according to claim 10, wherein the disk drive receiving portion of each of said carriers is towards one end of the respective carrier and the mounting arrangement for the respective carriers is such that the centre of rotation of the carrier is adjacent an end opposite to said one end of the carrier.

12. Apparatus according to claim 11, wherein the mounting arrangement for each disk drive carrier comprises a forced pivot adjacent said opposite end of the disk drive carrier and about which the carrier is fixed for pivotal movement in the housing.

13. Apparatus for supporting a disk drive that has a disk which rotates in use about a disk axis and an arm which pivots over the disk in use about an arm axis, the disk axis and the arm axis being generally perpendicular to the plane of the disk, the apparatus comprising:
    a disk drive carrier having a disk drive receiving portion adjacent one end in which a disk drive can be received;
    a housing in which the carrier can be received; and,
    a mounting arrangement for supporting the carrier within the housing,
    the mounting arrangement comprising a forced pivot adjacent an end opposite to said one end of the disk drive carrier outside the disk drive receiving portion and about which the carrier is fixed for pivotal movement in the housing substantially parallel to the arm axis.

14. Apparatus according to claim 13, comprising at least one isolator for isolating the carrier from the housing, the at least one isolator being connected to the carrier at a position that is outside the disk drive receiving portion of the carrier.

15. Apparatus according to claim 14, comprising plural isolators for isolating the carrier from the housing, each of the isolators being respectively connected to the carrier at a position that is outside the disk drive receiving portion of the carrier.

* * * * *